United States Patent [19]

van der Lely et al.

[11] 3,944,000
[45] Mar. 16, 1976

[54] ROTARY HARROWS

[76] Inventors: Ary van der Lely, 10, Weverskade, Maasland; Cornelis Johannes Gerardus Bom, 36, Esdoornlaan, Rozenburg, both of Netherlands

[22] Filed: Apr. 16, 1974

[21] Appl. No.: 461,384

[52] U.S. Cl. .................. 172/59; 172/248; 172/439; 172/677
[51] Int. Cl.² .................... A01B 33/00; A01B 63/00
[58] Field of Search ............. 172/272, 59, 111, 248, 172/439, 245, 677

[56] References Cited
UNITED STATES PATENTS
3,765,491  10/1973  van der Lely et al........... 172/111 X FOREIGN PATENTS OR APPLICATIONS
6,807,548  12/1969  Netherlands.......................... 172/59
1,807,202   6/1969  Germany .............................. 172/59

Primary Examiner—Stephen C. Pellegrino
Attorney, Agent, or Firm—Mason, Mason & Albright

[57] ABSTRACT

A rotary harrow attachment has a frame portion to which coupling elements can be connected in alternative locations so that the attachment can be connected to the front or the rear of a prime mover on a multi-point hitch. The p.t.o. of the prime mover is drivenly connectable to the soil working members by a gear box which is also detachable and repositionable 180° on the frame portion.

10 Claims, 2 Drawing Figures

ROTARY HARROWS

This invention relates to rotary harrows, such harrows being of the kind comprising a frame portion extending transverse to the intended direction of operative travel of the harrow, a plurality of soil working members or rotors rotatably supported by said frame portion and means for coupling the frame portion to an operating vehicle.

According to the invention, there is provided a rotary harrow of the kind set forth, wherein said coupling means are of a readily detachable construction for cooperation with a multipoint lifting device or hitch of an operating vehicle, the readily detachable coupling means being adapted for connection with at least two locations on the frame portion.

Figure 1:
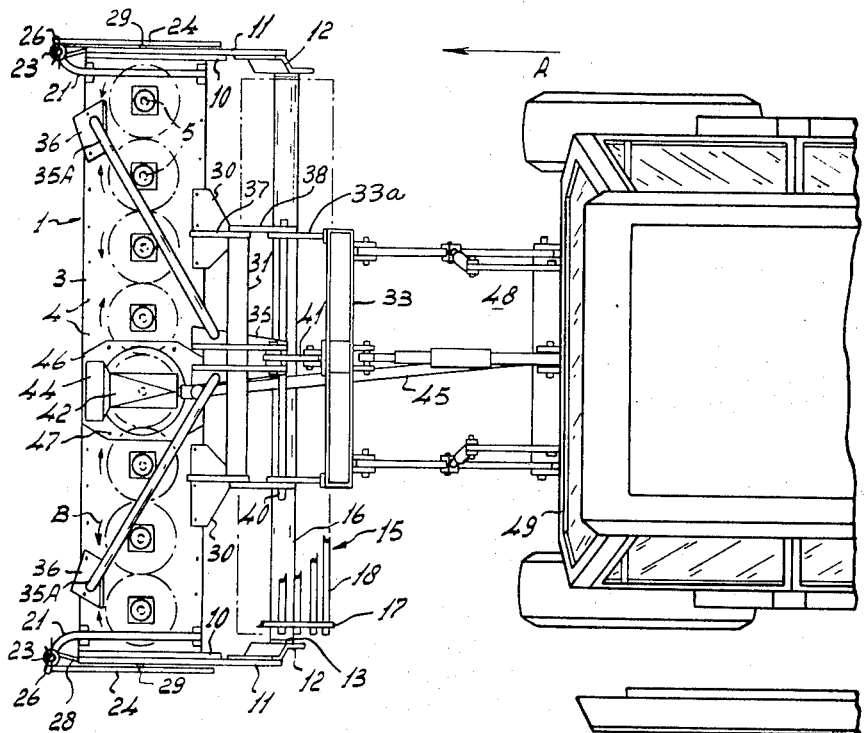
Figure 2:
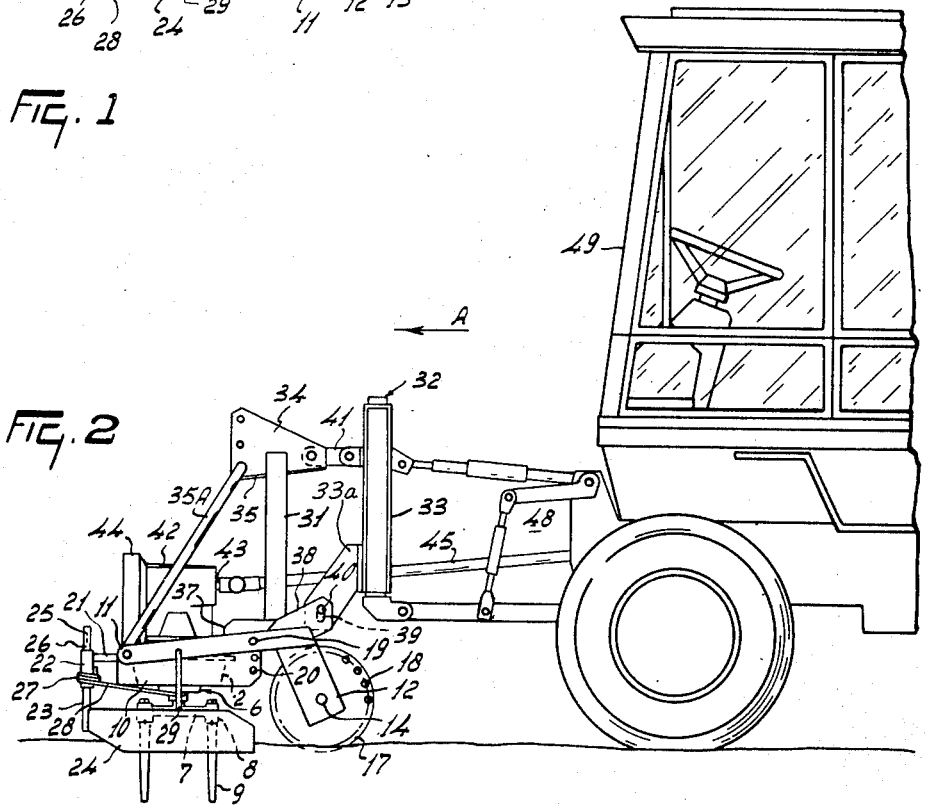

For a better understanding of the invention, and to show how the same may be carried into effect, reference will now be made, by way of example, to the accompanying drawings, in which:

FIG. 1 is a plan view of a rotary harrow or soil cultivating implement in accordance with the invention coupled to the front of an operating vehicle, and FIG. 2 is a side elevation corresponding to FIG. 1.

Referring to the drawings, the rotary harrow, soil cultivating implement or cultivator (which will hereinafter be referred to only as a rotary harrow) has a hollow box-shaped frame portion 1 that extends substantially horizontally and substantially perpendicular to the intended direction of operative travel of the harrow which is indicated by an arrow A in both Figures of the drawings. The frame portion 1 is comprised principally by a lower member 2 that is of channel-shaped cross-section with the limbs (in cross-section) of the channel diverging upwardly away from the base and by a cover plate 3 fastened by bolts 4 to substantially horizontal rims at the upper edges of the limbs or flanges of the lower member 2. If required, there could be two or more cover plates 3 arranged in substantially coplanar relationship in place of the single cover plate 3. A plurality of upwardly extending, or at least substantially vertical, shafts 5 are rotatably journalled in upper and lower bearings carried by the frame portion 1 at regularly spaced apart intervals which may conveniently have magnitudes of substantially 25 centimeters. There are eight of the shafts 5 in the example illustrated in the accompanying drawings and each shaft 5 is provided at its lowermost end, beneath the frame portion 1, with a corresponding soil working member or rotor 6. Each soil working member or rotor 6 comprises a substantially horizontal tine support 7 having its center rigidly secured to the lowermost end of the corresponding shaft 5, the opposite ends of the support 7 being provided with two substantially vertically disposed sleeve-like tine holders 8. The tine holders 8 receive fastening portions of tines 9 which tines also comprise active or soil working portions that are inclined rearwardly by a few degrees with respect to the intended directions of rotation B (FIG. 1) of the soil working members or rotors 6 concerned so that said portions of the tines 9 may be considered to occupy trailing dispositions with respect to the directions B.

The opposite lateral sides or ends of the frame portion 1 are closed by substantially vertical plates 10 to the tops and fronts of which, with respect to the direction A, arms 11 are connected so as to be turnable about a common substantially horizontal axis that is parallel to the transverse length of the frame portion 1. The rearmost ends of the arms 11 with respect to the direction A carry downwardly and rearwardly inclined supports 12 which are furnished with horizontal bearings 13 near their lowermost extremities. The horizontal bearings 13 rotatably receive stub shafts 14 at the opposite ends of a rotary supporting member in the form of a ground roller 15. The roller 15 extends parallel to the transverse length of the frame portion 1 and to the single row of soil working members or rotors 6 throughout substantially the whole of the working width of the rotary harrow. The roller 15 thus extends transverse, and normally substantially horizontally perpendicular, to the direction A. The roller 15 has a central support shaft or tube 16 which is surrounded by a plurality of elongate elements 18 that are held at equal distances from the shaft or tube 16 at regular intervals around the longitudinal axis of that shaft or tube by substantially vertical support plates 17 rigidly connected to the shaft or tube 16. The elements 18 extend substantially parallel to the axis of rotation of the roller 15 but it is possible, as an alternative, to arrange them in helically wound dispositions around that axis. The rearmost edges of the plates 10 with respect to the direction A are formed with a number of holes 20 that are equally spaced from the common axis of the pivotal connections of the arms 11 to those plates 10 and horizontal locking pins or bolts 19 are provided which can be entered through single holes in the arms 11 and chosen holes 20 to maintain the arms 11 and the roller 15 in corresponding angular settings about the common axis of the pivotal connection between said arms and the plates 10. It will be apparent that the level of the axis of rotation of the rotary supporting member or ground roller 15 that is thus chosen will determine the horizontal level of the frame portion 1 above the ground surface and thus the depth of penetration of the tines 9 into the soil.

The top of the frame portion 1 is provided, near its opposite lateral sides or ends, with two tubular supports 21 that both extend parallel to the direction A but whose leading ends are bent over outwardly away from the center of the harrow. The bent-over ends of the supports 21 carry substantially vertical sleeves 22 in which upright arms 23 are turnably received. The lowermost ends of the arms 23 carry substantially vertical shield plates 24 beneath the sleeves 22 while the ends of said arms 23 that project above the sleeves 22 are formed with transverse holes 25 through chosen ones of which retaining pins 26 are entered to prevent the arms 23 and shield plates 24 from moving downwardly beyond the positions dictated by abutments of the pins 26 against the upper ends of the sleeves 22. Coil springs 27 are wound around the sleeves 22 and have their upper ends anchored in holes in those sleeves. The lower ends 28 of the springs 27 are of elongate configuration and bear against upright arms 29 carried centrally at the tops of the shield plates 24 in such a way that said ends 28 of the springs 27 tend to urge said plates 24 inwardly towards the soil working members or rotors 6 until the arms 29 which they carry bear against the pivotally mounted arms 11 which thus limit the inward movements of the plates 24.

Substantially horizontal plates 30 are fastened to the top and rear of the frame portion 1 with respect to the direction A by some of the bolts 4 and these plates 30 carry a coupling member 31. Since the coupling member 31 is secured to the frame portion 1 by some of the bolts 4 which interconnect the cover plate 3 and the lower member 2 of said frame portion 1, the coupling member 31 can quickly and easily be connected to, or disconnected from, the frame portion 1. The top and bottom of the coupling member 31 comprise elements for the detachment of a portion 33 of a known quick-release coupling 32. As viewed in the direction A, the coupling member 31 is of substantially isosceles triangular configuration and carries, at its apex, a pair of coupling elements in the form of substantially vertical plates 34 arranged in parallel and closely spaced apart relationship. The lowermost edges of the plates 34, which are of generally triangular configuration, are provided with horizontally and outwardly bent-over rims 35 and it will be seen from the drawings that downwardly and forwardly divergent, with respect to the direction A, struts 35A extend from leading regions of said rims 35 to horizontal plates 36 which are secured to the top and front of the frame portion 1, at locations towards the lateral sides or ends thereof, by further of the bolts 4 that have been mentioned above. The lower corners of the substantially triangular coupling member 31 are provided with substantially vertical plates 37 to which coupling elements in the form of substantially vertical plates 38 are secured. The plates 38 are inclined upwardly and rearwardly with respect to the direction A away from the plates 37 and their rearmost ends are formed with short vertically extending slots 39. A substantially horizontal transverse shaft 40 is, or equivalent pins are, entered through the slots 39 and through apertured members 33a of the portion 33 of the known quick-release coupling 32 to establish a connection between the coupling member 31 and the quick-release coupling 32. An upper region of the portion 33 of the quick-release coupling 32 is connected to the plates 34 at the top of the coupling member 31 by an arm 41 provided with horizontal pivots at both its ends.

One of the center pair of the eight rotary shafts 5 of the harrow that is illustrated in the drawings has an upward extension through the cover plate 3 into a gear box 42. The extension is provided, inside the gear box, with a bevel pinion whose teeth mesh with those of a further bevel pinion carried by a shaft that extends substantially parallel to the direction A. One end of the shaft which has just been mentioned projects from the front of the gear box 42 into a change-speed gear 44 having a removable protective casing or cover. An overlying shaft 43 that is parallel to the substantially horizontal shaft that has just been mentioned also has a foremost end that projects into the change-speed gear 44 and the ends of the two shafts can be drivingly interconnected by exchangeable and/or interchangeable toothed pinions to give different transmission rations between the two shafts in dependence upon the co-operating pinions that are chosen. The rear end of the shaft 43 projects from the back of the gear box 42 and is splined or otherwise keyed to enable it to be placed in driven connection with a front power take-off shaft of an operating vehicle 49 through the intermediary of a telescopic transmission shaft 45 of a construction that is known per se having universal joints at its opposite ends. The gear box 42 is secured to the top of the frame portion 1 in a readily releasable manner, and gear box comprising, at its foot, a substantially horizontal plate 46 which is fastened to the cover plate 3 by bolts 47. The connection is such that, after temporarily removing the bolts 47, the gear box can be turned through 180° about the axis of the extension of the shaft 5 with which it co-operates and can then be re-secured to the cover plate 3 by replacing the bolts 47. The gear box 42 can thus occupy a position appropriate for the use of the rotary harrow at the front of the operating vehicle 49, as illustrated, or for use at the rear of the same or another operating vehicle.

In the use of the rotary harrow that has been described, it is connected to a three-point lifting device or hitch 48 at the front of the operating vehicle 49 by way of the known quick-release coupling 32 and the coupling member 31 whose coupling elements or plates 34 and 38 co-operate with the portion 33 of the quick-release coupling 32 in the manner that has already been described. The telescopic transmission shaft 45 is arranged to transmit rotary drive from the front power take-off shaft of the vehicle 49 to the end of the shaft 43 that projects from the rear of the gear box 42. As the rotary harrow and vehicle combination moves over the ground in the direction A, its soil working members or rotors 6 revolve in the directions B indicated in FIG. 1 of the drawings and the tines 9 of the members or rotors 6 work individual strips of soil that overlap one another to produce, in effect, a single broad strip of worked soil because the effective distances between the tines 9 of each individual member or rotor 6 are slightly greater than the distances between neighbouring shafts 5. A depth of penetration of the tines 9 into the soil appropriate to the operation that is to be carried out is maintained by the ground roller 15 upon entering the locking pins or bolts 19 in correspondingly chosen holes 20. The elongate elements 18 of the roller 15 tend to crush any large lumps of soil that may sometimes be left on the surface by the foregoing tines 9. The upward and rearward, with respect to the direction A, disposition of the vertical plates or coupling elements 38 at the foot of the coupling member 31 prevents an upper region of the roller 15 from fouling those plates when a setting for substantially maximum pentration of the tines 9 into the soil is adopted as illustrated in the drawings. The tines 9 of the soil working members or rotors 6 at the opposite ends of the row thereof co-operate with the shield plates 24 during operation so as to crumble the soil displaced by those tines 9 and minimise the formation of soil ridges and the like. If an obstacle such as a stone, piece of wood or the like should get between the tines 9 and one of the plates 24, that plate can turn outwardly about the axis of the corresponding arm 23 and sleeve 22 against the action of the co-operating spring 27 to prevent the tines 9 and the plate 24 concerned from being damaged.

It is, of course, most desirable that the rotary harrow should be movable with respect to the known quick-release coupling 32 that is itself connected to the three-point lifting device or hitch 48 at the front of the vehicle 49. The upward and downward freedom of movement that is required is obtained because the ends of the transverse shaft 40 are movable upwardly and downwardly in the slots 39 while the plates 34 are detachably connected to said portion 33 through the intermediary of the arm 41 which comprises substantially horizontally disposed pivots at both its leading and rear ends with respect to the direction A. The rotary harrow that has been described has readily detachable coupling means that can be releasably secured to at least two locations on the frame portion 1. The readily detachable coupling means comprise the coupling member 31 and its struts 35A which are releasably connected to the top of the frame portion 1 by some of the readily releasable bolts 4 that secure the cover plate 3 of that portion 1 to the underlying lower member 2 thereof. After removing the readily detachable coupling means from the frame portion 1, said coupling means can be re-connected to that frame portion in such a way as to extend generally forwards therefrom with respect to the direction A instead of generally rearwards as illustrated in FIGS. 1 and 2. Upon such re-arrangement, the struts 35A will extend from the plates 34 to the rear of the top of the frame portion 1 with respect to the direction A. The gear box 42 is also released from the frame portion 1 by temporarily removing the bolts 47, said gear box being subsequently turned through 180° and being re-secured to the top of the frame portion 1 with the change-speed gear 44 at its rear with respect to the direction A and with the splined or otherwise keyed end of the shaft 43 projecting forwardly therefrom with respect to that direction.

The construction which has been described enables the rotary harrow to be used either at the front of an operating vehicle, as illustrated in the drawings, or at the rear thereof merely by releasing and repositioning the readily detachable coupling means and by turning the gear box 42 through 180° around the axis of the extension of the shaft 5 with which it co-operates. No details of the operating vehicle 49 have been given and such vehicle may be an agricultural or other tractor or any vehicle that is capable of supporting and operating a rotary harrow.

Although various features of the rotary harrow that has been described will be set forth in the following claims as inventive features, it is emphasised that the invention is not necessarily limited to those features and that it includes within its scope each of the parts of the rotary harrow that has been described and/or illustrated in the accompanying drawings both individually and in various combinations.

What we claim is:

1. A rotary harrow attachment comprising a frame and a plurality of rotary soil-working members mounted on a transverse frame portion of said frame, said transverse frame portion comprising driving means for said soil-working members to rotate said members on upwardly extending axes, a detachable coupling means on said frame for connection to a multipoint lifting hitch of a prime mover, said coupling means including an upwardly extending triangular configured coupling member and downwardly diverging struts connected to at least one generally vertical plate at the apex of said coupling member, the lower part of said coupling member and the lower ends of said struts each being connectable to the front or rear of said frame portion by plate means and bolts, spaced apart slotted plates being connected to said lower part, said coupling member being linked to a triangular coupling of a prime mover by a pivoted arm that interconnects said apex with the upper portion of said coupling and a shaft that extends through said slotted plates and an apertured member at the base of said coupling.

2. A rotary harrow attachment comprising a frame and a plurality of soil working members mounted on a transverse frame portion of said frame, said transverse frame portion comprising driving means for said soil working members to rotate said members on upwardly extending axes, a detachable coupling means on said frame for connection to a multipoint lifting hitch of a prime mover, said coupling means including an upwardly extending coupling member and downwardly diverging struts connected to at least one generally vertical plate at the apex of said coupling member, means connecting the lower part of said coupling member and the lower ends of said struts to the front or rear of said frame portion, spaced apart plates being connected to said lower part, said coupling member being linked to a triangular coupling of a prime mover by a pivoted arm that interconnects said apex with the upper portion of said coupling and by pivot means that extends between said plates and an aperture at the base of said coupling.

3. A harrow as claimed in claim 2, wherein a gear box is mounted substantially centrally on said frame portion and said gear box is engaged with said driving means to rotate the soil-working members during operation, said gear box having a substantially horizontal plate detachably bolted to a cover plate of said frame portion, said horizontal plate being detachable from said frame portion and reconnectable in a second position substantially 180° about a substantially vertical axis, said horizontal plate being fixable in either of two opposite positions, whereby the power take off at the rear or the front of the prime mover can be connected to said gear box.

4. A harrow as claimed in claim 3, wherein said soil-working members are rotatable about substantially vertical shafts and are arranged in a row, an upward extension of one of said shafts being located in a central region of said row, said extension being received in said gear box and said gear box together with said horizontal plate being turnable through 180° about said extension to move said gear box to two opposite and operative positions.

5. A harrow as claimed in claim 2, wherein said frame portion has a cover plate bolted to the remainder of that portion and the lower end of each strut is connected to a corresponding substantially horizontal plate, the lower portion of said coupling member being connected to further substantially horizontal plates, said horizontal plates and further horizontal plates each being releasably secured to the cover plate by bolts.

6. A rotary harrow attachment comprising a frame and a plurality of rotary soil working members mounted on a frame portion of said frame, said frame portion comprising driving means for said soil working members to rotate those members on upwardly extending axes, a detachable coupling means on said frame for connection to a multipoint lifting hitch of a prime mover, said coupling means including an upwardly extending coupling member and downwardly diverging struts connected to the upperside of said coupling member, means for connecting the lower part of said coupling member and the lower ends of said struts to the front or rear respectively of said frame portion, spaced apart plate means being connected to said lower part of the coupling member, said plate means extending upwardly and away from said frame portion, said coupling member linked to a coupling of a prime mover by a pivoted arm that interconnects said upper side of the coupling member with the upper portion of said coupling and by pivot means at the base of said coupling, a rotatable supporting member being pivoted to said frame portion at the rear thereof, relative to the direction of travel, said rotatable member being located below said plate means.

7. A harrow as claimed in claim 6, wherein said coupling means is connectable substantially centrally on said frame portion with respect to the opposite lateral sides of said frame portion.

8. A harrow as claimed in claim 6, wherein said coupling member is located at the rear of said frame portion when said harrow is pushed at the front of the prime mover.

9. A harrow as claimed in claim 6, wherein said supporting member is a roller positioned substantially directly below said plate means.

10. A harrow as claimed in claim 9, wherein said roller is mounted on arms pivoted to said frame portion and said arms together with the roller are adjustable in vertical directions relative to said frame portion.

* * * * *